United States Patent
John

(10) Patent No.: US 8,984,614 B2
(45) Date of Patent: Mar. 17, 2015

(54) SOCKS TUNNELING FOR FIREWALL TRAVERSAL

(71) Applicant: Rockstar Consortium US LP, Plano, TX (US)

(72) Inventor: Mathew John, Raleigh, NC (US)

(73) Assignee: Rockstar Consortium US LP, Plano, TX (US)

( * ) Notice: Subject to any disclaimer, the term of this patent is extended or adjusted under 35 U.S.C. 154(b) by 78 days.

(21) Appl. No.: 13/804,239

(22) Filed: Mar. 14, 2013

(65) Prior Publication Data
US 2013/0198395 A1   Aug. 1, 2013

Related U.S. Application Data

(63) Continuation of application No. 10/723,841, filed on Nov. 26, 2003, now Pat. No. 8,407,777.

(51) Int. Cl.
*G06F 9/00* (2006.01)
*H04L 29/06* (2006.01)

(52) U.S. Cl.
CPC ........ *H04L 29/06544* (2013.01); *H04L 63/029* (2013.01)
USPC ............................................. 726/11; 726/14

(58) Field of Classification Search
CPC .... H04L 29/06544; H04L 63/029; G06F 9/00
USPC .................................... 726/11, 12, 13, 14, 15
See application file for complete search history.

(56) References Cited

U.S. PATENT DOCUMENTS

| 6,104,716 | A  * | 8/2000  | Crichton et al. ............... 370/401 |
| 7,020,700 | B1   | 3/2006  | Bennett et al. |
| 7,428,752 | B2 * | 9/2008  | Rutherglen et al. ............. 726/12 |
| 2002/0108089 | A1 | 8/2002 | Reid et al. |
| 2002/0133723 | A1 | 9/2002 | Tait |
| 2002/0143962 | A1 | 10/2002 | Carter |
| 2002/0147927 | A1 | 10/2002 | Tait |
| 2002/0180725 | A1 | 12/2002 | Simmonds et al. |
| 2003/0097554 | A1 | 5/2003 | Cheston et al. |
| 2003/0131263 | A1 * | 7/2003 | Keane et al. ................... 713/201 |
| 2003/0175815 | A1 | 9/2003 | Nikiforov |
| 2003/0177384 | A1 * | 9/2003 | Jones et al. .................... 713/201 |
| 2003/0217149 | A1 | 11/2003 | Crichton et al. |
| 2004/0236726 | A1 | 11/2004 | Ewing et al. |
| 2004/0255307 | A1 | 12/2004 | Irudayaraj |

(Continued)

OTHER PUBLICATIONS

Non-Final Office Action for U.S. Appl. No. 10/723,841, mailed May 16, 2007, 7 pages.

(Continued)

*Primary Examiner* — Samson Lemma
(74) *Attorney, Agent, or Firm* — Withrow & Terranova, PLLC

(57) ABSTRACT

The present invention provides a unique way of implementing the SOCKS protocol for establishing connections through a firewall. In general, instead of having a SOCKS server implemented entirely in the firewall, SOCKS servers are implemented on both a server and a client, which are configured to communicate with each other through the firewall. The SOCKS servers on the server and client allow multiple objects on both the server and the client to communicate with each other through a single port through the firewall, wherein the SOCKS servers on the server and the client cooperate with each other and their respective objects to allow the objects to establish the connections.

23 Claims, 5 Drawing Sheets

(56) References Cited

U.S. PATENT DOCUMENTS

| | | |
|---|---|---|
| 2005/0007567 A1 | 1/2005 | Pierrat et al. |
| 2005/0037367 A9 | 2/2005 | Fiekowsky et al. |
| 2005/0125511 A1* | 6/2005 | Hunt .............................. 709/220 |
| 2005/0204306 A1 | 9/2005 | Kawahara et al. |
| 2006/0242241 A1 | 10/2006 | Tock et al. |
| 2006/0265749 A1 | 11/2006 | Kwon et al. |
| 2008/0077710 A1 | 3/2008 | Kouvelas et al. |
| 2010/0115149 A1 | 5/2010 | Ewer |
| 2011/0171948 A1 | 7/2011 | Labuda et al. |

OTHER PUBLICATIONS

Final Office Action for U.S. Appl. No. 10/723,841, mailed Oct. 16, 2007, 14 pages.

Advisory Action for U.S. Appl. No. 10/723,841, mailed Jan. 15, 2008, 4 pages.

Non-Final Office Action for U.S. Appl. No. 10/723,841, mailed Jun. 11, 2008, 12 pages.

Final Office Action for U.S. Appl. No. 10/723,841, mailed Dec. 12, 2008, 16 pages.

Examiner's Answer to Appeal Brief for U.S. Appl. No. 10/723,841, mailed Sep. 17, 2009, 22 pages.

Patent Board Decision on Appeal for U.S. Appl. No. 10/723,841, mailed Sep. 12, 2012, 13 pages.

Notice of Allowance for U.S. Appl. No. 10/723,841, mailed Nov. 23, 2012, 5 pages.

* cited by examiner

SOCKS TUNNELING FOR FIREWALL TRAVERSAL

FIELD OF THE INVENTION

The present invention relates to network communications, and in particular to an improved technique for tunneling through firewalls.

BACKGROUND OF THE INVENTION

Given the need to protect network servers, firewalls are employed to ensure that only authorized communications take place with the server. A significant problem facing many client-server applications is that the client runs outside of the firewall, and thus must be able to establish connections with the server through the firewall. In most applications, only a limited set of ports is available on the firewall to facilitate communications between the client and the server. Many applications, such as Common Object Request Broker Architecture (CORBA), and to a limited extent, Remote Method Invocation for Java (RMI), rely on the ability to dynamically open ports within a selected range, such as those ports greater than 1024, to establish communications between the client and the server. Such a configuration puts a severe constraint on the firewall, since it now has to open up all of its ports because it does not know which port will be selected by the applications. In most situations, the server operators are unwilling to take the risk of opening so many ports and leaving a relatively large number of openings into their server. Accordingly, there is a need for a way to effectively tunnel through a firewall using a restricted number of ports in an efficient and effective manner, without requiring significant modification to existing client and server applications.

SUMMARY OF THE INVENTION

The present invention provides a unique way of implementing the SOCKS protocol for establishing connections through a firewall. In general, instead of having a SOCKS server implemented entirely in the firewall, SOCKS servers are implemented on both a server and a client, which are configured to communicate with each other through the firewall. The SOCKS servers on the server and client allow multiple objects on both the server and the client to communicate with each other through a single port through the firewall, wherein the SOCKS servers on the server and the client cooperate with each other and their respective objects to allow the objects to establish the connections. To establish an overall connection between objects on the client and server, the following connections are initially established: a first connection between a client object and a client SOCKS server; a second connection between the client SOCKS servers and the server SOCKS server; and the third connection between the server object and the server SOCKS server. The second connection between the SOCKS server is the connection through which the firewall is traversed. Through these three connections, the objects on the client and server may communicate with each other through the firewall.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a networking environment according to one embodiment of the present invention.

FIGS. 2A and 2B provide an exemplary communication flow for establishing connections through a firewall according to one embodiment of the present invention.

FIG. 3 provides an exemplary communication flow for establishing connections through a firewall according to a second embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
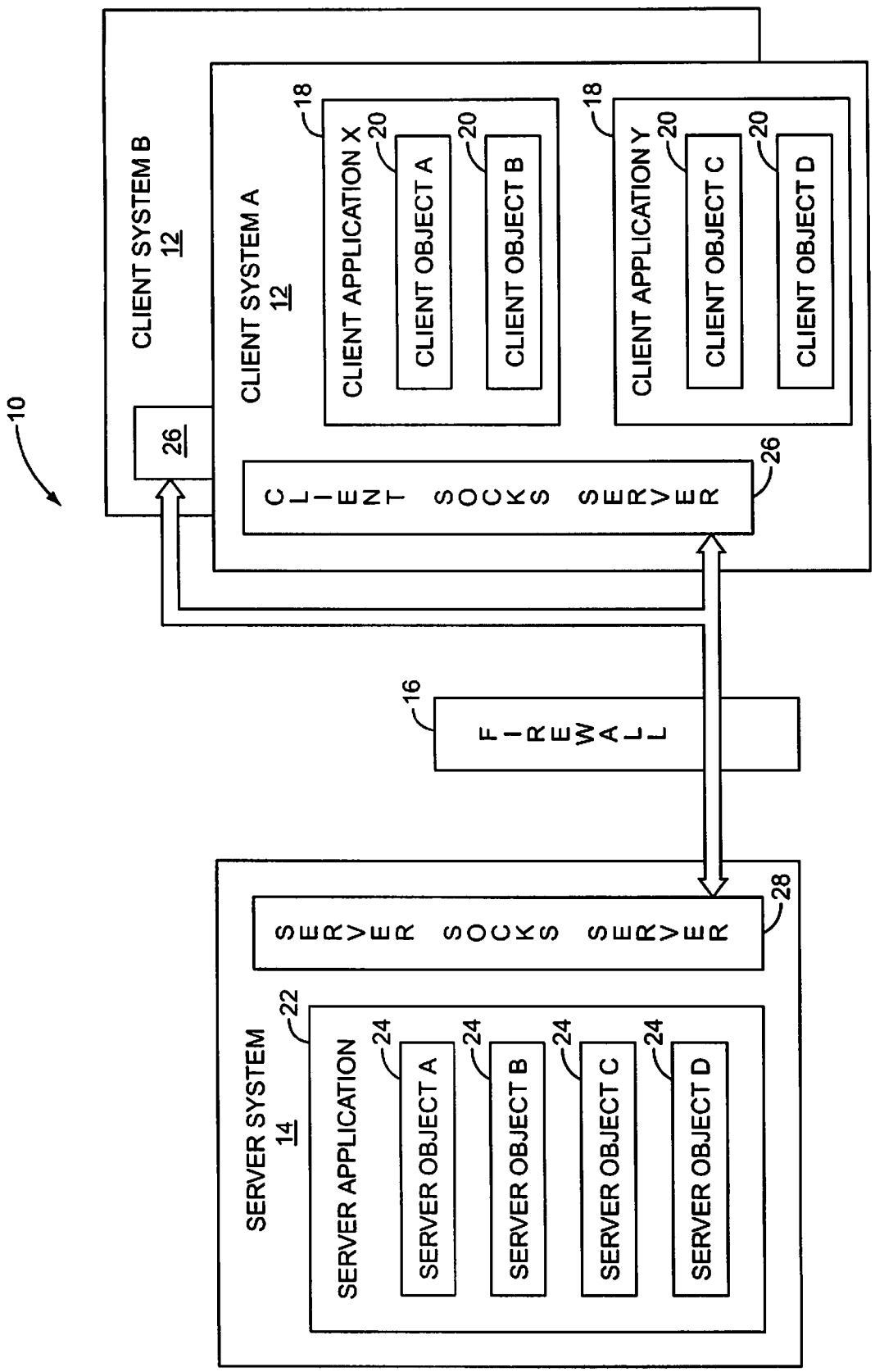

Prior to delving into the details of the present invention, an overview of a basic networking environment 10 is illustrated in FIG. 1. As illustrated, the networking environment 10 includes multiple client systems 12 (A and B), which are capable of communicating with a server system 14 through a firewall 16. In traditional fashion, the client systems 12 will include and be capable of running one or more client applications 18 (X and Y), which may provide multiple client objects 20 (A-D) that are capable of communicating with each other and with the server system 14. The server system 14 will include and be able to run a server application 22, which may have multiple server objects 24 (A-D) capable of communicating with the client applications 18, and in particular with one or more of the client objects 20. The communications between the client system 12 and the server system 14 may use Java Virtual Machine (JVM) to facilitate communications.

For the present invention, instead of implementing the SOCKS server in the firewall 16, a client SOCKS server 26 is implemented on each of the client systems 12, and a server SOCKS server 28 is implemented on the server system 14. To establish connections between server objects 24 and client objects 20, three connections are established: a first connection between the active client object 20 and the client SOCKS server 26; a second connection between the client SOCKS server 26 and the server SOCKS server 28; and a third connection between the active server object 24 and the server SOCKS server 28. Through these three connections, the client object 20 and the server object 24 may communicate. Notably, the server SOCKS server 28 and the client SOCKS server 26 will cooperate such that multiple connections in either direction may be established through a common port of the firewall 16. During operation, the server SOCKS server 28 and the client SOCKS server 26 will keep track of and facilitate the connection through the firewall 16 without knowledge of the respective server objects 24 and client objects 20.

Figure 2A:
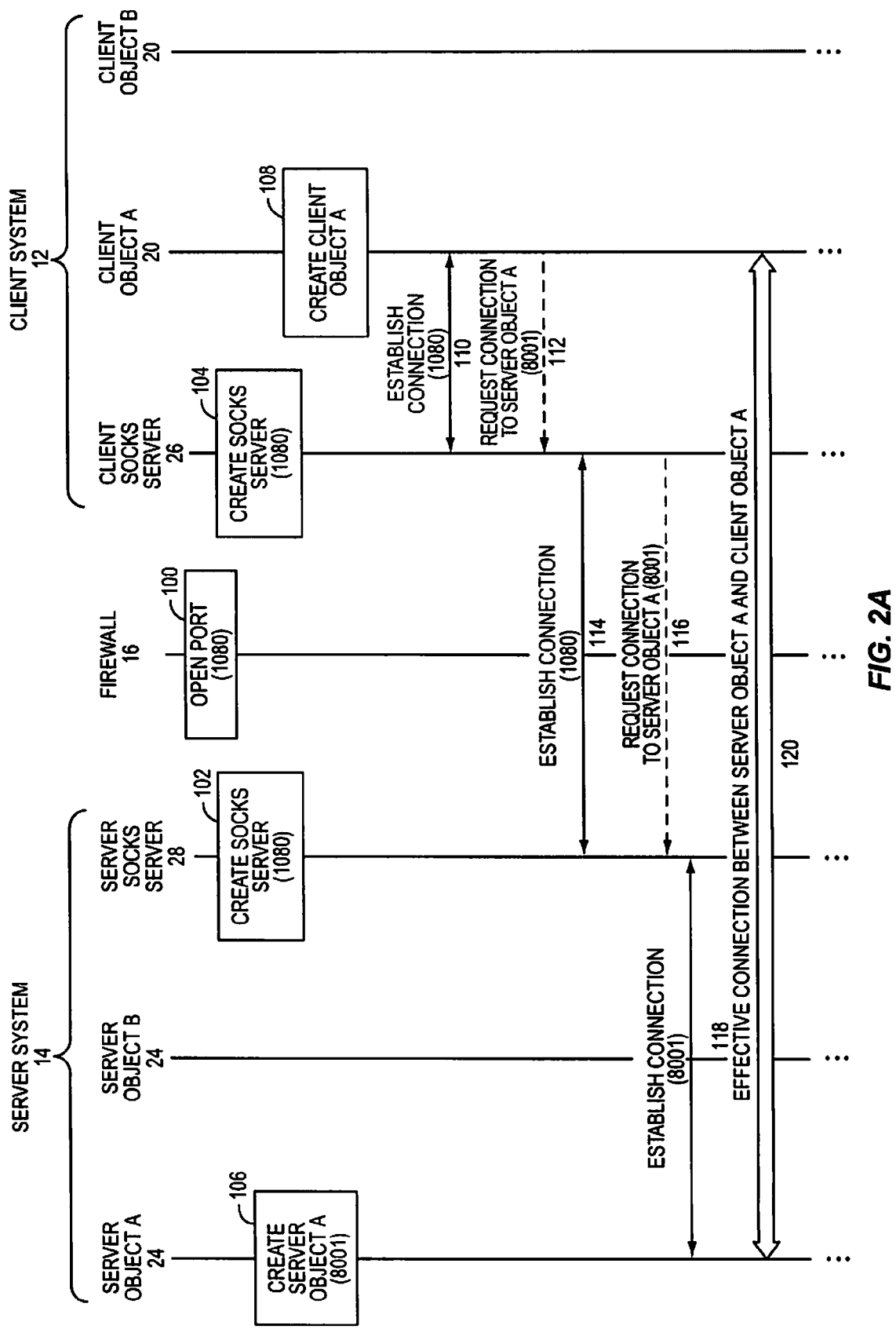
Figure 2B:
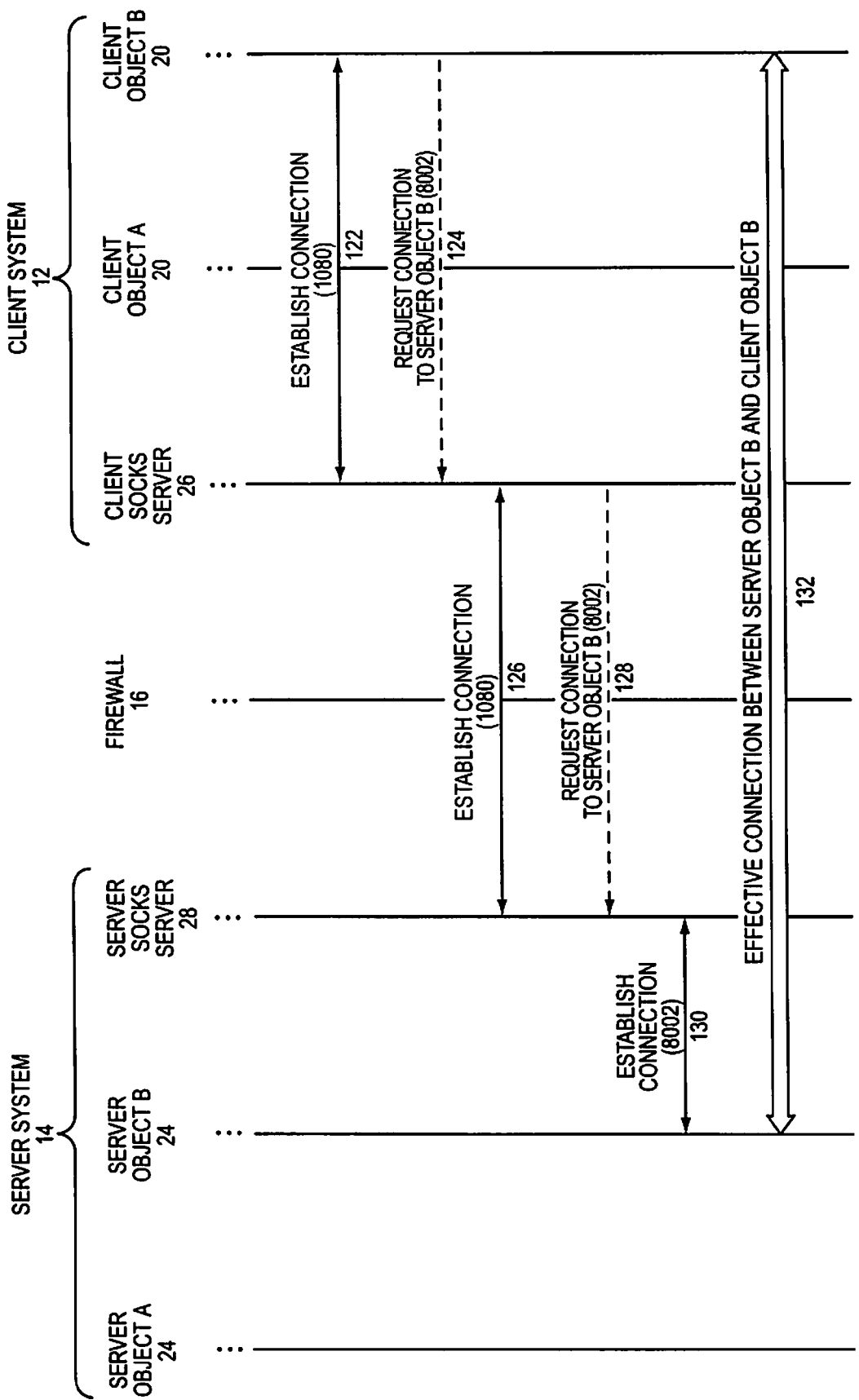

With reference to FIGS. 2A and 2B, an exemplary communication flow is provided, wherein an effective connection between client object 20A and server object 24A is established, followed by establishing a connection between client object 20B and server object 24B. In the illustrated example, the connections are initiated by client object 20A and the client object 20B, respectively. Initially, the firewall 16 will open a port for such connections (step 100). For the purposes of illustration, assume that the port through which connections are established through the firewall 16 is port 1080. Next, the server SOCKS server 28 and the client SOCKS server 26 are created (steps 102 and 104). Both the server SOCKS server 28 and the client SOCKS server 26 are configured to listen on their respective ports 1080, which corresponds to the port through which connections will be established through the firewall 16.

Next, a server object 24A is created (step 106), and in traditional fashion, will be established to listen on a random port. Assume that this random port is port 8001 for purposes of illustration. When client object 20A is created (step 108), and desires to establish a connection with server object 24A, client object 20A will be provided or will otherwise access the port number to which the server object 24A is listening (port 8001). Once the port for the server object 24A is known, the client object 20A will establish a connection with the client SOCKS server 26 using port 1080 (step 110) and request a connection to server object 24A using port 8001 (step 112). In response, the client SOCKS server 26 will establish a connection with the server SOCKS server 28 using port 1080 through the firewall 16 (step 114), and request a connection to the server object 24A using port 8001 (step 116). The server SOCKS server 28 will then establish a connection with server object 24A using port 8001 (step 118), wherein an effective connection between server object 24A and client object 20A is established (step 120). At this point, a bi-directional communication session may take place using the effective connection between server object 24A and client object 20A through port 1080 of the firewall 16.

At this point, assume that client object 20B needs to establish a connection with server object 24B, which is listening on port 8002. As such, client object 20B will establish a connection with the client SOCKS server 26 using port 1080 (step 122) and request a connection to server object 24B using port 8002 (step 124). The client SOCKS server 26 will then establish a connection through the firewall 16 with the sever SOCKS server 28 using port 1080 (step 126) and request a connection to server object 24B using port 8002 (step 128). The server SOCKS server 28 will then establish a connection with server object 24B using port 8002 (step 130), wherein an effective connection between server object 24B and client object 20B is established (step 132).

The connection between the server SOCKS server 28 and the client SOCKS server 26 may be a regular socket connection, or may be encrypted using various techniques, such as the Secure Socket Layer (SSL), for increased security. The SOCKS servers 26, 28 are preferably configured to connect with other SOCKS servers if the address of the remote entity is outside of the system in which the requesting SOCKS server is located. If the connection is intended for a location on the same system, then the requesting SOCKS server will establish a connection directly within the system, without forwarding the request for a connection to another SOCKS server.

For most client-server sessions where security is implemented, clients are required to initiate the client-server session. For the present invention, if the server system 14 desires to establish a secure session with the client system 12, the server system 14 may instruct the client system 12 to initiate a new connection, which will be secure, over an existing connection, which may have been initiated by either the server system 14 or the client system 12.

Figure 3:
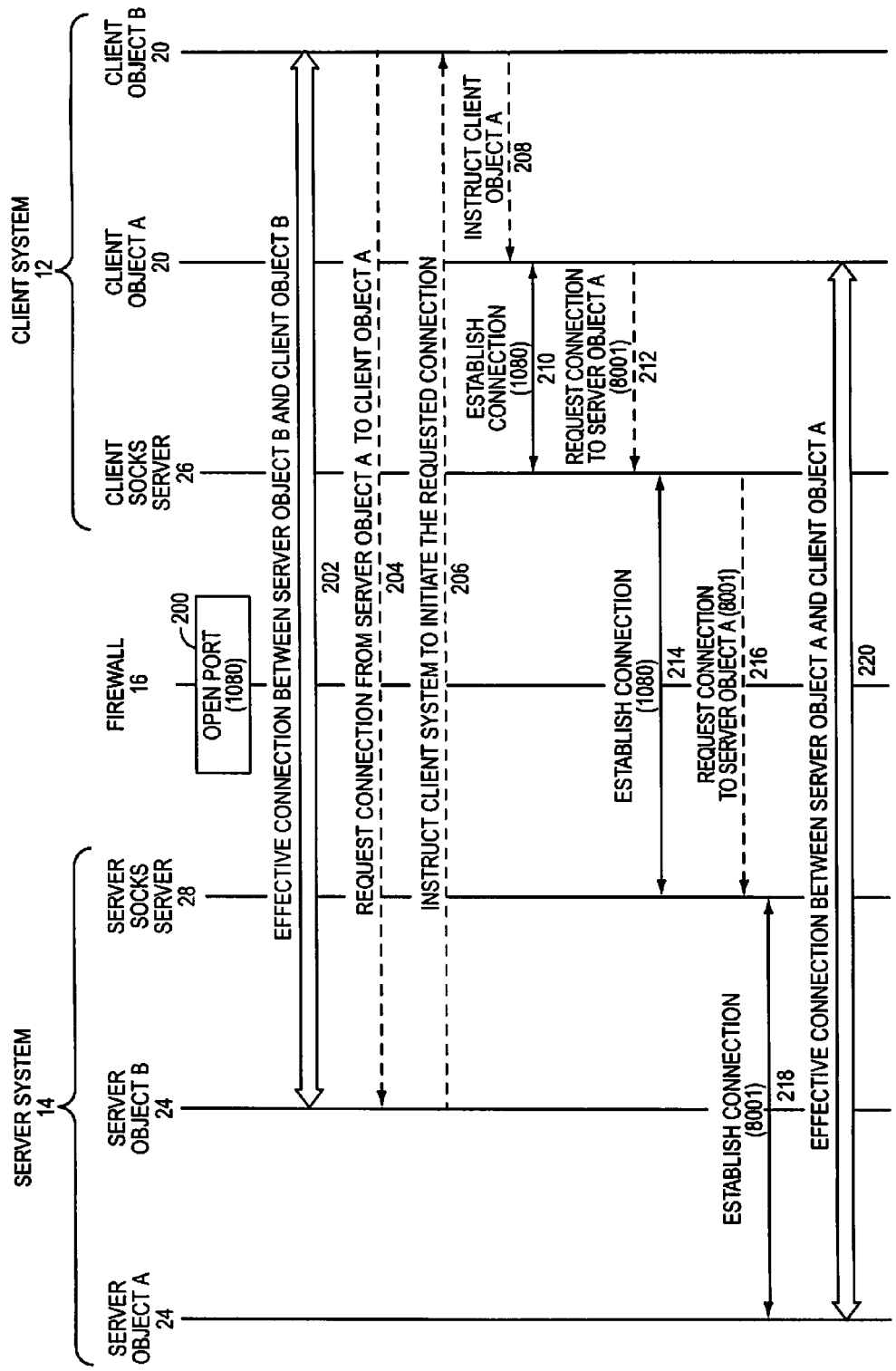

The communication flow diagram of FIG. 3 illustrates an exemplary situation wherein the client system 12 requests a connection with the server system 14, the server system 14 instructs the client system 12 to initiate a new connection, such that a secure connection may be established, and then the client system 12 initiates a new connection. Initially, assume that the firewall 16 opens port 1080 through which communication connections may be established (step 200). Further assume that an effective connection between server object 24B and client object 20B has already been established in a fashion similar to that described above (step 202). Assume also that the client object 20B requests that a new connection be established from server object 24A to client object 20A (step 204). The server system 14, through the server object 24B, will instruct the client system 12 to initiate the requested connection using client object 20A in order to invoke the available security for the connection (step 206). Client object 20B may instruct client object 20A to establish the connection (step 208). Client object 20A will then establish a connection with the client SOCKS server 26 using port 1080 (step 210) and request a connection to server object 24A using port 8001 (step 212), assuming the same port allocation as described above. The client SOCKS server 26 will then establish a secure connection with the server SOCKS server 28 using port 1080 through the firewall 16 (step 214) and request a connection to server object 24A using port 8001 (step 216). Then, the server SOCKS server 28 will establish a connection with server object 24A using port 8001 (step 218). At this point, an effective connection between server object 24A and client object 20A is established (step 220), wherein at least the connection between the server SOCKS server 28 and the client SOCKS server 26 is secure, and any traffic transmitted over the connection is encrypted with the appropriate encryption techniques, such as those implemented by SSL.

Although the above example allows signaling for establishing a new connection with security over an existing connection, an additional protocol may be established wherein such signaling may be established over the same connection over which the secure session is established. As such, all data transmissions and connection requests between the server SOCKS server 28 and the client SOCKS server 26 use the same connection.

Figure 5:
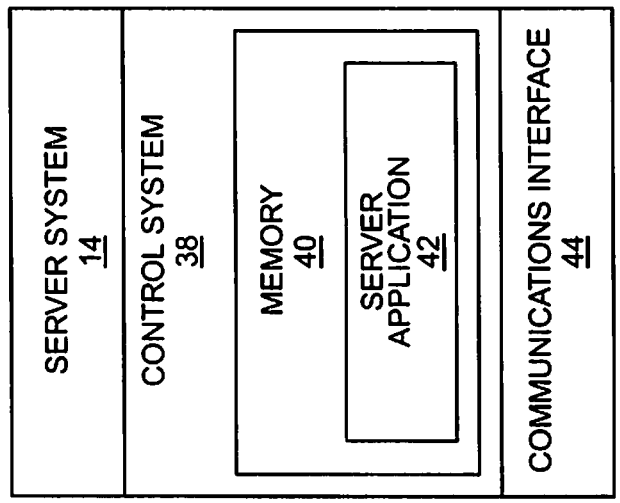
FIG. 5 is a block representation of a server system according to one embodiment of the present invention.
Figure 4:
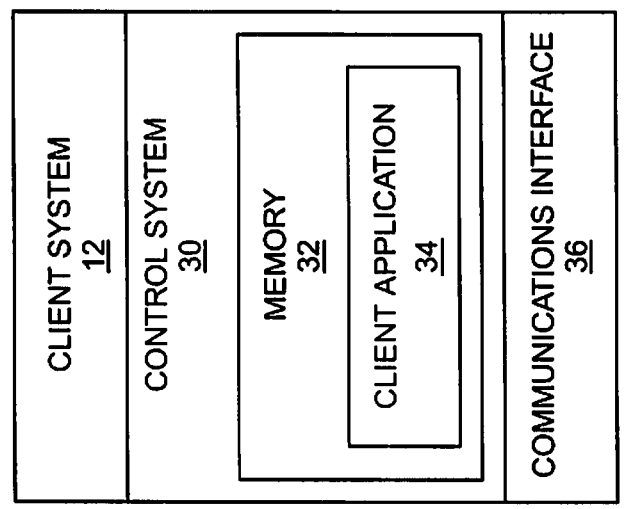
FIG. 4 is a block representation of a client system according to one embodiment of the present invention.

With reference to FIG. 4, an exemplary client system 12 is illustrated. The client system 12 may be implemented in any type of computing system, which will generally include a control system 30 with sufficient memory 32 for running a client application 34. The control system 30 is also associated with a communications interface 36 to facilitate connections with the firewall 16 or intermediate network. Similarly, the server system 14 as illustrated in FIG. 5 may be any type of computing system having a control system 38 with sufficient memory 40 for running a server application 42. The control system 38 will also be associated with a communications interface 44 to support communications with the firewall 16 directly or through one or more intermediate networks.

One of the benefits of the present invention is that the connections through the firewall 16 are through the socket creation layer, wherein higher level protocols are supported without change. For example, Common Object Request Broker Architecture (CORBA), Remote Method Invocation for Java (RMI), and like protocols are supported without changes to existing interfaces or software code. As noted, the invention supports the establishment of connections for events, as well as requests for callbacks to initiate secure connections. Accordingly, the present invention facilitates an effective and efficient technique for tunneling through firewalls 16 without the disadvantages of prior techniques.

Those skilled in the art will recognize improvements and modifications to the preferred embodiments of the present invention. All such improvements and modifications are considered within the scope of the concepts disclosed herein and the claims that follow.

What is claimed is:

1. A method of establishing communications between first and second communication systems through a firewall, the first and second communications systems comprising first and second SOCKS servers respectively, the method comprising:
    establishing a first connection between the first SOCKS server and a first object in the first communication system;
    establishing, through the firewall, a second connection between the first SOCKS server and the second SOCKS server;
    receiving, at the first SOCKS server, a request to initiate a connection from the first object to a second object in the second communication system;
    sending, from the first SOCKS server to the second SOCKS server, a request to initiate a connection from the first object to the second object; and
    establishing a third connection from the second SOCKS server to the second object in the second communication system;
    wherein the first, second, and third connections form an overall connection through the firewall between the first and second objects.

2. The method of claim 1, comprising providing the first SOCKS server in the first communication system.

3. The method of claim 1, wherein the request to initiate a connection from the first object to the second object received at the first SOCKS server identifies a first port which is associated with the second object.

4. The method of claim 3, wherein the first connection uses a second port associated with the first SOCKS server.

5. The method of claim 3, wherein the request to initiate a connection from the first object to the second object sent from the first SOCKS server to the second SOCKS server identifies the first port which is associated with the second object.

6. The method of claim 5, wherein the second connection uses a third port associated with the second SOCKS server.

7. The method of claim 6, wherein the second and third ports correspond to the same firewall port through which the firewall is traversed.

8. The method of claim 1, wherein the first, second, and third connections support bidirectional communications.

9. The method of claim 1, comprising:
    establishing a fourth connection between the first SOCKS server and a third object in the first communication system;
    establishing, through the firewall, a fifth connection between the first SOCKS server and the second SOCKS server;
    receiving, at the first SOCKS server, a request to initiate a connection from the third object to a fourth object in the second communication system;
    sending, from the first SOCKS server to the second SOCKS server, a request to initiate a connection from the third object to the fourth object; and
    establishing a sixth connection from the second SOCKS server to the fourth object in the second communication system;
    wherein the fourth, fifth, and sixth connections form an overall connection through the firewall between the third and fourth objects.

10. The method of claim 9, wherein the request to initiate a connection from the third object to the fourth object received at the first SOCKS server identifies a fourth port which is associated with the fourth object.

11. The method of claim 10, wherein the fourth connection uses a fifth port associated with the first SOCKS server.

12. The method of claim 10, wherein the request to initiate a connection from the third object to the fourth object sent from the first SOCKS server to the second SOCKS server identifies the fourth port which is associated with the fourth object.

13. The method of claim 12, wherein the fifth connection uses a sixth port associated with the second SOCKS server.

14. The method of claim 13, wherein the fifth and sixth ports correspond to a firewall port through which the firewall is traversed.

15. The method of claim 14, wherein the second, third, fifth and sixth ports correspond to the same firewall port through which the firewall is traversed.

16. The method of claim 1, wherein connection requests and data transmissions are transmitted over the same connections.

17. The method of claim 1, wherein the first communication system is a client system and the second communication system is a server system.

18. The method of claim 1, wherein the first communication system is a server system and the second communication system is a client system.

19. The method of claim 1, comprising encrypting communications facilitated over the overall connection between the first and second communication systems.

20. A method of establishing communications through a firewall between a first object in a first communication system and a second object in second communication system, the first and second communications systems comprising first and second SOCKS servers respectively and a first connection already being established through the firewall between a third object in the first communication system and a fourth object in the second communication system, the method comprising:
    the third object requesting, over the first connection, a connection between the first object and the second object;
    the fourth object instructing the first object, over the first connection, to initiate the requested connection;
    the third object instructing the first object to initiate the requested connection; and
    the first object initiating a second connection through the firewall between the first object and the second object.

21. The method of claim 20, wherein the first object initiates the second connection by:
    establishing a connection between the first object and the first SOCKS server; and
    sending the first SOCKS server a request to establish a connection with the second object in the second communication system.

22. The method of claim 21, wherein the first SOCKS server responds to the request to establish a connection with the second object in the second communication system by establishing a connection with the second SOCKS server and sending a request to the second SOCKS server to establish a connection with the second object in the second communication system.

23. The method of claim 22, wherein the second SOCKS server responds to the request to establish a connection with the second object in the second communication system by establishing a connection with the second server object in the second communication system, thereby completing establishment of the second connection through the firewall between the first and second objects.

\* \* \* \* \*